(12) United States Patent
Fee et al.

(10) Patent No.: US 6,415,314 B1
(45) Date of Patent: *Jul. 2, 2002

(54) DISTRIBUTED CHASSIS AGENT FOR NETWORK MANAGEMENT

(75) Inventors: Brendan Fee, Nashua; Kurt Dobbins, Bedford; Dave Arneson, Bow; Pat Mullaney, Nashua, all of NH (US)

(73) Assignee: Enterasys Networks, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/130,234

(22) Filed: Aug. 6, 1998

Related U.S. Application Data

(63) Continuation of application No. 08/644,330, filed on May 10, 1996, now Pat. No. 5,812,771, which is a continuation of application No. 08/187,856, filed on Jan. 28, 1994, now Pat. No. 5,522,042.

(51) Int. Cl.[7] .............................................. G06F 15/16

(52) U.S. Cl. ........................ 709/201; 709/202; 709/203

(58) Field of Search ................................ 709/201, 202, 709/203, 238, 245

(56) References Cited

U.S. PATENT DOCUMENTS

| | | | | |
|---|---|---|---|---|
| 4,692,918 A | | 9/1987 | Elliott et al. .................. 370/85 |
| 4,918,589 A | | 4/1990 | Floro et al. ................... 364/132 |
| 5,018,137 A | * | 5/1991 | Backes et al. ............... 370/401 |
| 5,060,228 A | * | 10/1991 | Tsutsui et al. ............... 370/402 |
| 5,088,032 A | * | 2/1992 | Bosack ......................... 709/242 |

(List continued on next page.)

FOREIGN PATENT DOCUMENTS

| EP | 0/467546 A3 | 1/1992 | ............. G06F/9/46 |
|---|---|---|---|

OTHER PUBLICATIONS

E.C. Arnold, et al., AT&T Bell Laboratories, Naperville, Illinois, International Switching Symposium, Session C3, Paper #3; Proceedings vol. II, pp. 97–105; Object Oriented Software Technologies Applied To Switching System Architectures And Software Development Processes.

Coral Broadband Enterprise Switch, Product Literature, Coral Network Corporation, Marlborough, MA 91994).

E. Oliveira et al., "Controlling Cooperative Experts In A Real Time System," University of Porto, Portugal, IEEE, London, UK, Third International Conference in Software Engineering For Real Time Systems (Conf. Publ.) No. 344, pp. 176–181 (Sep. 16–18, 1991).

(List continued on next page.)

Primary Examiner—Mehmet B. Geckil
(74) Attorney, Agent, or Firm—Wolf, Greenfield & Sacks, P.C.

(57) ABSTRACT

An apparatus and method for allocating the performance of applications in a networking chassis among one or more modules in the chassis. In particular, the system acts as a chassis agent for performing network management functions. The agent performs a discovery function whereby each module discovers the location and current utilization of resources and applications for itself and transmits that information to other modules, and wherein each module maintains a slot table of such information for all modules. Based on the information in the slot table, each module performs an election function for allocating applications among the various modules in the chassis. The agent uses MIBs to gather information about the chassis and to effect control on the chassis, wherein each managed object is registered both locally and remotely in a MIB tree maintained on each module, and the data is maintained locally on the module on which the managed object resides. The system enables the chassis to be managed "as a whole" while the management functions are distributed across the system, and the system is both fault tolerant and enables ready expansion and modification of the management applications.

7 Claims, 5 Drawing Sheets

U.S. PATENT DOCUMENTS

| | | | | |
|---|---|---|---|---|
| 5,144,622 A | * | 9/1992 | Takiyasu et al. | 370/401 |
| 5,155,808 A | | 10/1992 | Shimizu | 395/200 |
| 5,161,192 A | | 11/1992 | Carter et al. | 380/48 |
| 5,179,554 A | * | 1/1993 | Lomicka et al. | 370/401 |
| 5,226,120 A | | 7/1993 | Brown et al. | 395/200 |
| 5,261,044 A | | 11/1993 | Dev et al. | 395/159 |
| 5,301,303 A | | 4/1994 | Abraham et al. | 395/500 |
| 5,319,644 A | * | 6/1994 | Liang | 370/258 |
| 5,497,463 A | * | 3/1996 | Stein et al. | 709/203 |
| 5,522,042 A | | 5/1996 | Fee et al. | 395/200.01 |
| 5,764,982 A | * | 6/1998 | Madduri | 709/202 |

OTHER PUBLICATIONS

U. Warrier et al., "The Common Management Information Services And Protocol Over TCP/IP (CMOT)", Hewlett Packard, RFC 1095, Apr. 1989, pp. 1–67.

L. Labarre, "OSI Internet Management: Management Information Base," MITRE, RFC 1214, Apr. 1991, pp. 1–83.

K. McCloghrie, "Extensions to The Generic–Interface MIB", Hughes LAN Systems, Inc., RFC 1229, May 1991, pp. 1–16.

L. Steinberg, "Techniques For Managing Asynchronously Generated Alerts," IBM Corporation, RFC 1224, May 1991, pp. 1–22.

Marc Shapiro, "Structure and Encapsulation in Distributed Systems: The Proxy Principle," IEEE Computer Society Press, The 6th International Conference on Distributed Computer Systems, May 19–23, 1986, pp. 198–204.

Vochteloo et al., "Capability–Based Protection in the Mingi Operating System," Proceedings of the Third International Workshop in Object IEEE Computer Society Press Orientation In Operating Systems, Dec. 9–10, 1993, pp. 108–115.

Carter et al., "Distributed Operating Systems Based On A Protected Global Virtual Address Space," IEEE Computer Society Press, Apr. 23–24, 1992, pp. 75–79.

* cited by examiner

DISTRIBUTED CHASSIS AGENT FOR NETWORK MANAGEMENT

This application is a continuation of U.S. Ser. No. 08/644,330, filed May 10, 1996, entitled DISTRIBUTED CHASSIS AGENT FOR NETWORK MANAGEMENT, now U.S. Pat. No. 5,812,771, which is a continuation of U.S. Ser. No. 08/187,856, filed Jan. 28, 1994, entitled DISTRIBUTED CHASSIS AGENT FOR NETWORK MANAGEMENT, now U.S. Pat. No. 5,522,042, issued May 28, 1996.

FIELD OF THE INVENTION

This invention relates to systems for network management, and more particularly to a system which allocates the management functions among different modules in a networking chassis.

BACKGROUND OF THE INVENTION

A computer network management system typically provides one or more of the following functions: monitoring activity on the network, detecting faults, generating alarms and/or isolating faults, allocating network resources, directing traffic, and determining or reconfiguring the network topology. As the complexity of computer networks increases, there is a growing need for improved management systems. In particular, there are concerns about a total or partial system "crash" (i.e., loss of network function) caused by a malfunction in the management system, the transmission and processing delays and reduction in memory space caused by the management operations themselves, and the inability to expand the network and/or major expense of replacing or upgrading the management system to accommodate a larger network.

In one prior art system, all management functions are provided on one module ("the management module") which is plugged into the networking chassis. A "networking chassis" is a housing and backplane which receives "networking cards" that perform various networking services, such as repeating, bridging and routing. Each networking card or module includes its own microprocessor. In this prior art system, the "management module" has all of the hardware and firmware necessary to collect, store and process all of the data required to manage the system. This creates a serious problem if there is a malfunction in the management module and it needs to be pulled, i.e., there is nothing left to manage the system. To guard against this catastrophe, the user may purchase a spare module but this is an expensive method of insurance. Also, even during normal operation, consolidating all of the management functions in one module creates a potential bottleneck when there is an increasing level of transmissions and/or processing. Still further, the management module has a defined capacity and thus there is an upper limit on the amount of allowable network expansion (i.e., increase in the number of ports and/or traffic). For this reason, the purchaser of the system must decide whether to buy a larger management system than it presently needs but which will accommodate future expansion, or an adequate system which may have to be fully replaced if there is further expansion.

In another prior art system, each module in the chassis separately manages its own functions. In this case the chassis is merely a "housing" containing independent networking systems. In addition to the complexities of separate management, this system has problems similar to the "one management module" system in regard to the loss of network service accompanying each management malfunction, a potential bottleneck where each module must conduct its own management, and limited expansion capacity.

It is an object of the present invention to provide a new type of network management system wherein the system is managed "as a whole" but the management functions are "distributed" across the system.

It is an object to provide a plurality of modules in a networking chassis which together handle the management functions and wherein a malfunction in one module will not substantially effect the functions of the other modules and the overall management of the network.

Another object is to provide a system which permits ready expansion of the network without requiring replacement of the management system.

Another object is to provide a system which allows modification of the management functions without requiring replacement of the entire management system.

Still another object is to provide a system with a better allocation of resources for management functions in order to provide a system with greater throughput.

These and other objects of the present invention will be evident from the following summary and detailed description of select embodiments of the present invention.

SUMMARY OF THE INVENTION

A distributed chassis agent ("DCA") for a network is provided which enables the chassis to be managed as a single system, and wherein any module can perform the management function or it can be performed by multiple modules simultaneously. The system scales to increasing module complexity and number as it spreads its workload across the modules contained within the chassis, discriminating against the most used modules. Using this system the degree of fault tolerance for the management of the chassis is equal to the number of modules contained within the chassis, as each module may be capable of performing the management function for the entire chassis.

The management function can be performed, for example, using the SNMP protocol which is part of the TCP/IP protocol suite. The management system is accessed via a network address which is known as the "chassis address." The management function may be run on one or more modules within the chassis, but is always assessed via the same chassis address.

Three new functions of the chassis agent are: a) a discovery function conducted by each module to determine, store and send to the other modules information specific to that module, and to listen to the messages of other modules and store similar information regarding the other modules; b) an election function conducted by each module to determine which module(s) should conduct a specific management function; and c) distributed MIBs, wherein each object in the MIB has an identifier (known as an OID) which is registered both locally (i.e., on the module on which it resides) and remotely (on all other modules in the chassis) in a naming tree (MIB) located on every module, while the data for each object is stored only in one module. These and other new functions of the chassis agent are more fully described below.

One of the benefits of the new system is that it can operate without synchronization of the modules. This avoids the problems and complexities inherent in a synchronized system. Thus, each module can have its own clock and broadcast asynchronously (after a specified announcement period of, for example, one second), during discovery and other functions. Each module will continuously receive information from the other modules and update its own slot table of module information. The system is in a continuous state of "controlled instability" such that the necessary database updates and allocation of management functions are achieved within a few clock ticks by each of the modules.

In order for the networking chassis to function as a single system (i.e., in the view of the network and its users), the networking modules and other components (e.g., the power supply) within the chassis need to discover each other. Each module is required to keep track of the presence or absence of other modules and components within the same chassis, and of other operational parameters of each module/component. Module discovery is a continuous process, with each module issuing on a timely basis (order of seconds) an unsolicited message on the backplane of the chassis. The message contains basic information about the module, such as its slot ID within the chassis, internal management and external data link addresses, and the status of various objects on the module. Each module uses this information to build its own slot table containing the basic information about itself and similar information regarding the other modules. This information is used by a module to discover in which chassis it is currently installed. Once the module is discovered and entered into the slot table, the module may be polled for information about its resources. Each module includes its own processor (CPU), memory, and interfaces. The information in the slot table compiled by each module may include information concerning the type, speed and utilization of its CPU, the type, size and consumed amount of its memory, and the type and speed of its interfaces. The information may further describe applications on that module, such as the type of application (stand-alone or distributed), and its status (enable, disable, standby). As described hereinafter, once the modules have discovered one another, additional discovery may take place regarding the managed objects within the chassis's database and an election of modules is made to perform each specific management application.

At start-up or after a system change (module failure/removal, etc.), an election process is required to discover the best location(s) to run a management application(s). The decision on where to locate an application (i.e., which module) within the chassis may be based on the following: module's available resources, current applications, current profile (i.e., current processing load), module type, and slot number. Each application may have its own set of instructions for selecting the best location at which to be executed. The election instructions are performed by each module using the data found in its slot table. As each module has the same view of the system, each election process will arrive at the same result. The module selected will issue an unsolicited message with the new status of its application list.

With respect to distributed MIBs, in one embodiment a MIB tree is maintained on every module with local or remote addresses (in the form of OIDs) for every managed object in the system, but the data for each object in the MIB is distributed and kept on only the local module (i.e., the module on which it resides). This saves space in that the data is not stored on every module. However, by registering each object both locally and remotely, each module can provide a single-point-of-access for all of the objects in the management system. Meanwhile, the system is fault tolerant in that the data for all objects is not stored on one module. In an alternative embodiment, the MIB tree is provided on only one module, while the data remains distributed. This system is fault tolerant in terms of the data, but does not provide a single-point-of-access on each module.

A major goal of the system is to operate in a fault tolerant manner. One method by which the present system achieves this result is that faults in the modules are detected by the other modules using module discovery. Module discovery allows the modules to discover the presence or absence of other modules in the chassis and their status. The system is designed to take advantage of the module discovery information by dynamically reconfiguring when a module is detected or lost with a minimal loss of network service.

A further measure of fault tolerance is achieved by providing two backplanes for intermodule management communications. The module discovery messages may be sent out on both backplanes, with a decision being made by the receiving module to elect one backplane (e.g., the fastest) for further communication with that module, until some failure necessitates a new election. The ability to switch immediately to the alternative backplane prevents a loss of network services.

These and other functions and benefits of the present invention will be more fully described in the following detailed description.

DETAILED DESCRIPTION

Figure 1:
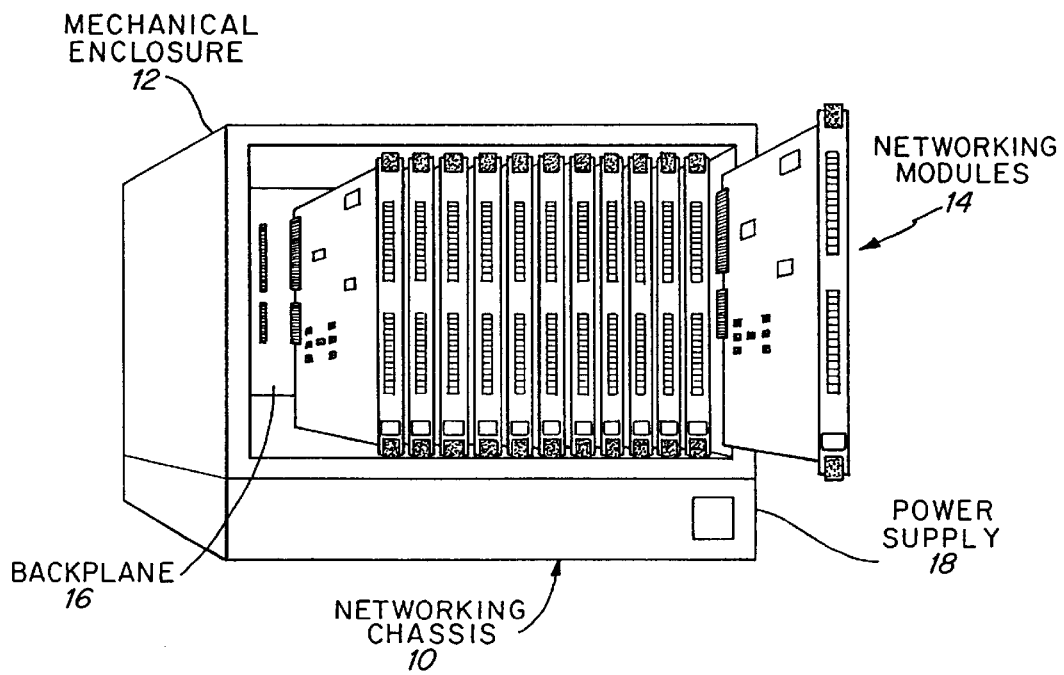
FIG. 1 is a perspective view of a networking chassis according to the present invention.

As shown in FIG. 1, a networking chassis 10 is a mechanical enclosure 12 that is used to house networking modules 14 such as repeater modules, bridge modules, terminal servers, file servers, etc. The chassis provides slots into which networking modules are inserted. Each module occupies one or more slots within the chassis.

The chassis in addition to being a mechanical enclosure provides a backplane 16 through which the modules inserted into the chassis are provided power from the chassis' power supply 18. The backplane is also used to provide networking connectivity between modules.

The chassis power supplies are modular units that are also inserted into the chassis, either at the back of the chassis or underneath the chassis. The networking chassis supports three types of power supplies:

Traditional Power Supplies (AC to DC supplies)

Uninterruptable Power Supplies (AC to DC/DC supplies)

Battery Backed Units (DC supplies)

Figure 2:
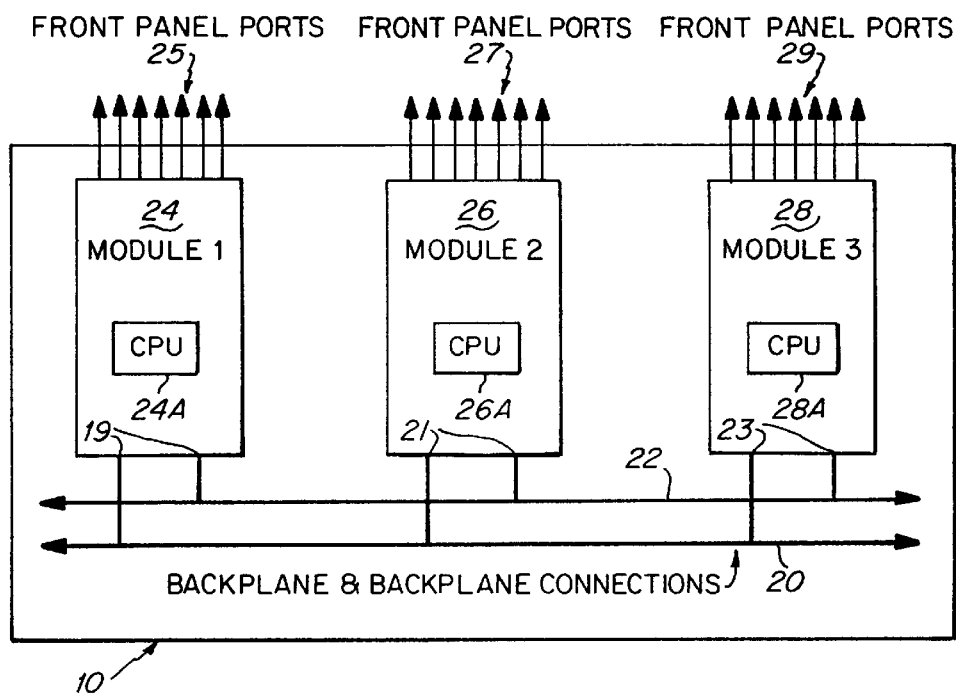
FIG. 2 is a logical view of the networking chassis.

Logically a traditional networking chassis may be viewed as a collection of network service providers connected via a common network (or networks). The common network (or networks) is provided by the chassis' backplane. FIG. 2 is a logical view of a networking chassis showing a pair of backplanes 20, 22 with connections to three modules 24, 26, 28, and each of the modules having a series of front panel ports 25, 27, 29, respectively.

Networking modules are microprocessor based (CPUs 24A, 26A, 28A in FIG. 2) and are generally constructed with two or more network ports; the network ports may appear at the front panel of the module (ports 25, 27, 29), or may be ports that connect to the chassis backplane (ports 19, 21, 23). The network ports are used for two purposes, firstly to perform networking services as repeating, bridging and routing, and secondly to provide access to the modules microprocessor for management purposes. Modules are traditionally managed using the SNMP protocol, a protocol which is part of the TCP/IP protocol suite. Each module is required to have its own network address known as an IP address. Each module also has a data link address known as a MAC address.

The SNMP protocol was developed by the IETF (Internet Engineering Task Force) and is specified in the following RFC:

RFC 1155 Structure of Management Information

RFC 1157 Simple Network Management Protocol

RFC 1212 Concise MIB definitions

RFC 1213 Management Information Base II (MIB-II)

The apparatus of the present invention, hereinafter referred to as the "Distributed Chassis Agent" (DCA), builds upon this model using the SNMP process in each module but only requiring a single IP and MAC address for the entire chassis. Also the DCA allows MIBs to be distributed across all modules in the chassis and accessible by each module's SNMP process. This allows the chassis to be viewed as a single system for management purposes rather than a collection of systems. The chassis and all it contains can be managed via a single agent who's work load is distributed across all the modules in the chassis. The construction of the DCA is broken down into the following parts:

1. Intermodule Communications
2. Discovery
3. Chassis Election
4. Chassis Agent Access
5. MIB distribution.

1. Intermodule Communications

A major component of the DCA is some form of intermodule communication. While the DCA appears as a single entity to the outside world, internal to the chassis it is a collection of programs running on a collection of modules. In order for the DCA to appear as a single agent the individual modules must be able to communicate with one another. In order for this communication to take place a common bus or network must be available to all the modules. In the present implementation a common communication protocol must be used by all the modules.

Figure 3:
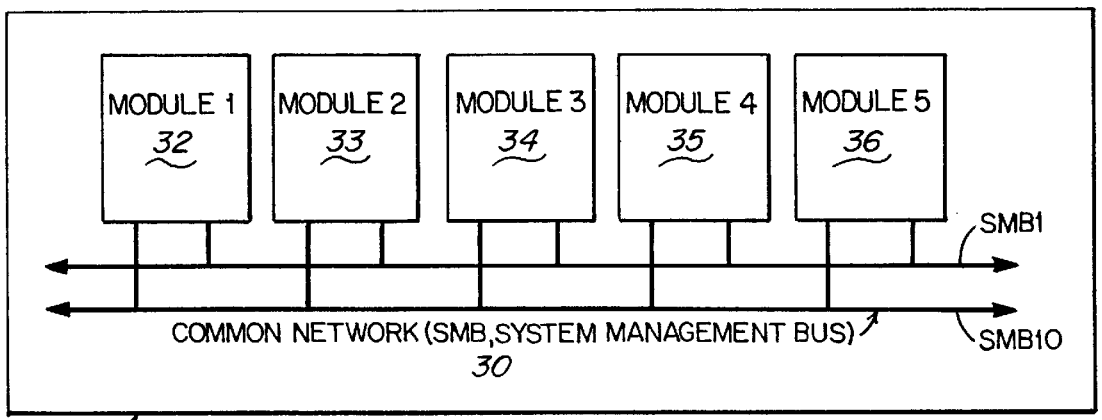
FIG. 3 is a schematic illustration showing the networking modules connected by two system management buses (SMB1 and SMB10)

Intermodule communications are accomplished in the present implementation via a system management bus (SMB). As shown in FIG. 3, the SMB 30 is composed of two LANs—SMB10 (based on ETHERNET), and SMB1 (based on LOCALTALK). The SMB is a means of communication between networking modules 32–36, and also provides an "out-of-band" link to NMSs (Network Management Stations) and file servers. The use of two common networks provides a level of fault tolerance; the SMB1 acts as a backup for the SMB10, and vice-a-versa. The SMB does not perform any form of load sharing. The DCA only requires that one common network be available. More than two common networks may be provided to gain even greater fault tolerance.

Figure 4:
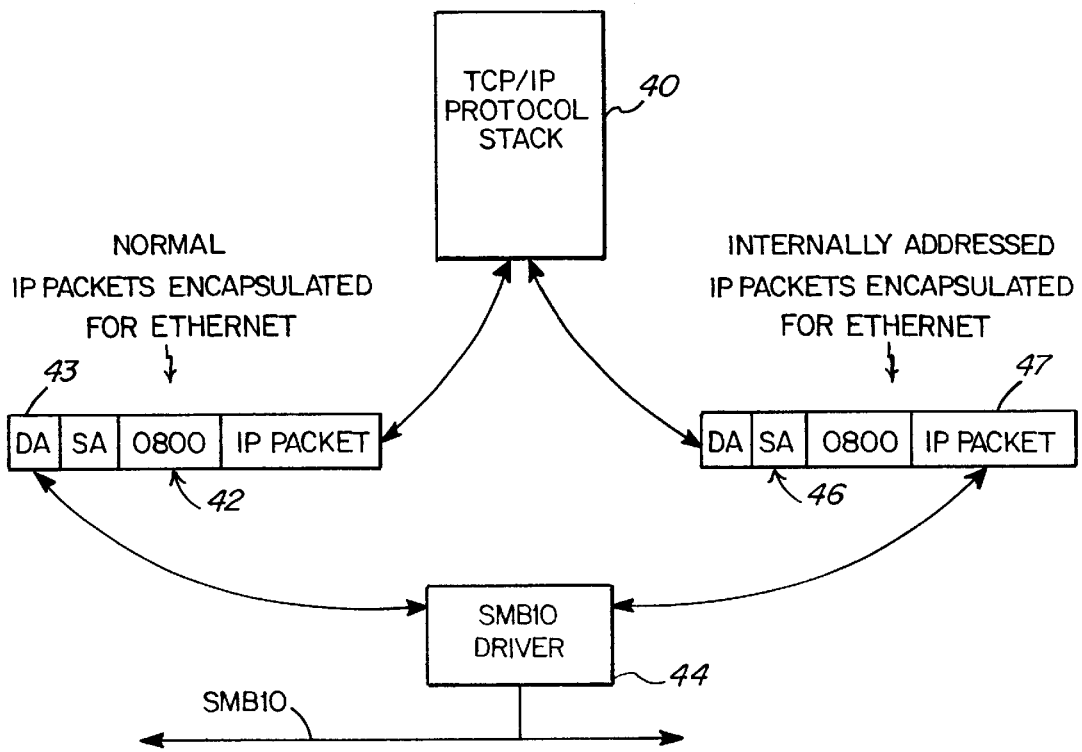
FIG. 4 is a schematic illustration of packet encapsulation for transmission on SMB10.

As illustrated in FIG. 4, intermodule communication by applications is performed using the TCP/IP protocol stack 40. The protocol stack allows applications running on modules 32–36 to communicate using either UDP sockets or TCP sockets. Most applications communicating over the SMB utilize UDP sockets, which provide a connectionless service. TCP provides a connection oriented service. TCP and UDP sockets are described in any documentation for Berkeley 4BSD UNIX and are readily known to those skilled in the art.

TCP and UDP run over an IP layer which performs the network addressing function. Each module/component on the SMB requires an internal IP address, which in this embodiment takes the following form:

127.chassis id.slot.host

Each module automatically assigns its own internal IP address based on its own information about the chassis in which it is installed, the slot it occupies and the number of hosts it supports. A 127.xx.xx.xx class A network number is used to ensure that internally assigned IP addresses will not clash with any externally assigned IP address. IP datagrams, when encapsulated for transmission over ethernet, use the ethernet protocol type assigned for IP protocol, namely type 0800h. IP datagrams using the internally assigned addresses, when encapsulated for transmission over the SMB10, use the ethernet protocol type 81CFh. IP datagrams using the internally assigned addresses, when encapsulated for transmission over the SMB1, use the LLAP protocol type 3. These protocols are described in and are readily known to those skilled in the art. By way of illustration, FIG. 4 shows (on the left) an "externally" addressed IP packet 42 encapsulated for ethernet, with SMB10 driver 44 accessing the destination address DA (43) in the header of packet 42. FIG. 4 shows on the right an "internally" addressed IP packet 46 encapsulated for ethernet, wherein the SMB10 driver 44 accesses the IP packet or data portion 47 of packet 46.

Each module on the SMB10 is also assigned a data link MAC address by the module's address PROM. MAC addresses are globally unique and are assigned by the IEEE.

Each module further assigns itself a LOCALTALK address based on the slot it occupies in the chassis.

2. Discovery

In order for the chassis to function as a single system (i.e., to the rest of the world), the modules and other components (e.g., the power supplies) within the chassis need to discover the chassis in which they are installed, the presence or absence of other modules and components within the same chassis, and other operational parameters within each module/component.

2.1. Slot Table

Figure 5:
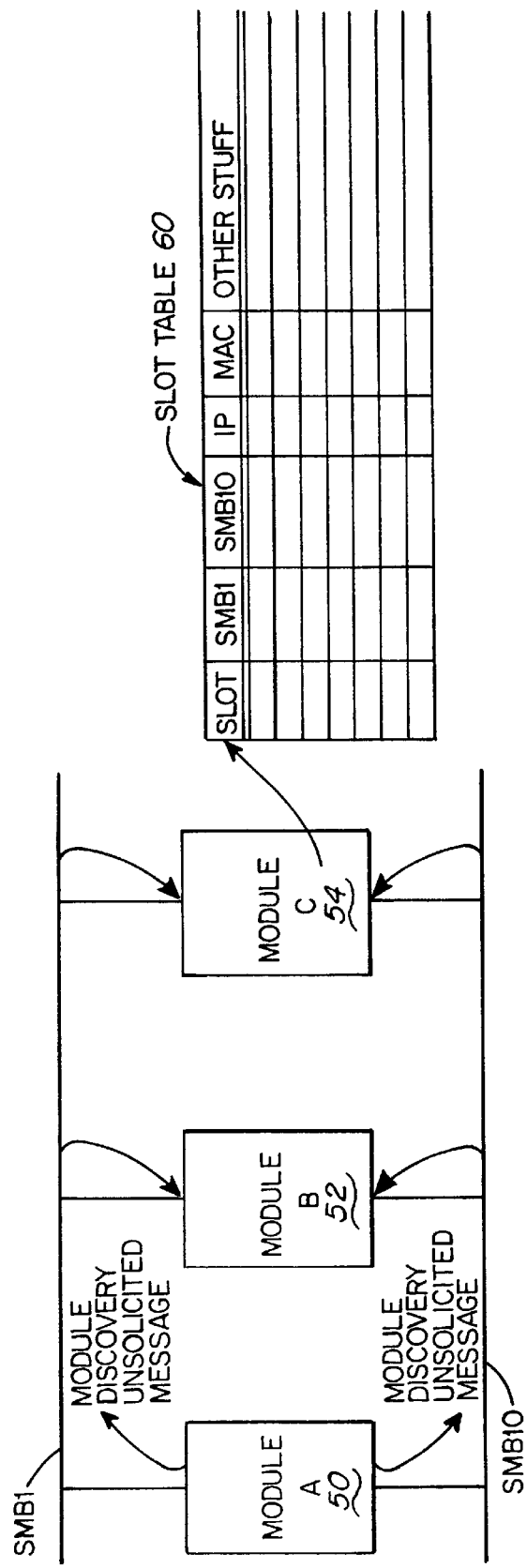
FIG. 5 is a schematic illustration of intermodule discovery showing the transmission of module discovery messages on the SMBs and the formation of a slot table.

Module discovery is a continuous process. Each module on a timely basis (order of seconds) issues an unsolicited message on both the SMB1 network (in the form of a broadcast) and the SMB10 network (in the form of a multicast). This is illustrated in FIG. 5 wherein a representative module 50 sends its module discovery message onto both SMB1 and SMB10, for receipt by the other modules 52 and 54. The message is an NVMP (network Variable Monitor Protocol) network variable containing basic information about module 50, such as:

Slot ID

LLAP address

MAC address

IP address

Module Type

Chassis IP address

Chassis MAC address

Chassis Serial number

SMB controller status

Model CPU status

Model CPU profile (i.e., CPU's current processing load)

The above information is used to build a slot table having an entry for each of the discovered modules. For example, in FIG. 5 a slot table 60 is shown which includes (from left to right) the following categories:

Slot: the slot number on the chassis occupied by the module

SMB1, SMB10: whether the module can be reached via one or both of the SMBs and which is preferred IP: the IP address of the module MAC: the MAC address of the module Other Stuff: other information regarding the module such as CPU status, CPU profile, module type, etc.

Each module (50, 52, 54) builds its own slot table. Each module monitors the SMB for messages from other modules in order to determine:

The presence or absence of a module

The ability to communicate with a module over the SMB1

The ability to communicate with a module over the SMB10

The current status, profile, type, etc., information for other modules.

Discovery only maintains the "current state" of the chassis. No attempt is made to maintain any historical information about the chassis slots.

2.2 Resource Discovery

Once a module is discovered and entered into the slot table, the module may be polled for information about its resources, such as:

CPUs (type, speed, utilization)

Memories (type, size, memory consumed)

Interfaces (type, speed)

2.3 Application Discovery

Once a module is discovered and entered into the slot table, the module may be polled for information about its applications, such as:

Application list

Type (Distributed or Nondistributed)

Status (Enabled, Disabled, Standby)

3. Chassis Election

Certain applications need to be supported by the chassis, but can be executed on any module (e.g., the distributed chassis agent). At start-up or after a system change (module failure/removal etc.), an election process is required to discover the best location(s) on which to run the chassis application(s). The decision on where to locate an application (i.e., which module) within the chassis is based on the following:

Module's Available Resources

Current Applications

Current Profile (i.e., CPU's current processing load)

Module Type

Slot Number

Each application may have its own set of instructions for selecting the best location for execution. The election instructions are performed by each module using the data found in its slot table. As each module has the same view of the chassis, each election process will arrive at the same result. In the event of a tie (two modules with exactly the same resources), then the module with the lower slot number may be chosen (or some other criteria used to resolve the tie). The module selected will issue an unsolicited message (application discovery) reflecting the new status of its application list.

4. Chassis Agent Access

The "chassis agent" is the software that allows the networking chassis to be managed as a single system. It is accessed via the network address known as the "chassis address." As communications with the chassis are performed using multiaccess networks like Ethernet, the chassis must also have a data-link address (or "MAC address"). The chassis address is a combination of its IP network and MAC address, and is referred to as the chassis IP/MAC address. The module acting as the DCA listens for packets having the chassis IP/MAC address.

The software may run on one or more modules within the chassis, but is always accessed via the same chassis address. The software is not dependent on any one module to perform its function. Each module may also have its own network address known as an "IP address." Each module must have a data link address known as a "MAC address." The chassis agent, regardless of where (on which module) it resides, always uses the same chassis IP/MAC address.

Packets destined for the Distributed Chassis Agent DCA (i.e., packets using the chassis IP/MAC address as the destination address) may arrive at the chassis via any one (or more) of its front panel ports (see ports 25, 27, 29 in FIG. 2), or in the case of the present implementation, it may also arrive via the SMB10, as the SMB10 is externalized. The packet is terminated (from the network point of view) at the entry point to the chassis. The module terminating the packet has two choices after it has terminated a packet destined to the DCA:

a) It may service the packet itself (i.e. act as the DCA) or b) It may forward the packet to another module for service.

The present implementation allows the SMB10 common network to be accessed from outside the chassis. The SMB10 may be used by a network management station (NMS) as a channel on which to manage the chassis. In the event that a NMS is located on the SMB10, a single module is elected to act as the DCA as all modules will receive packets destined to the DCA (i.e., the SMB10 is a multi-access network).

5. MIB Distribution

The DCA uses MIBs to gather information about the chassis and to effect control on the chassis. A MIB is a collection of managed objects (MOs) organized into a naming (MIB) tree with each object having a unique name or identifier within the tree. The identifier is known as an OID or Object IDentifier. In order for the DCA to operate as a single entity across all the modules in the chassis, all the MIBs supported by the chassis must be distributed across all the modules.

5.1 MIB Tree

The MIB tree is distributed across all modules within the chassis. The data contained within the distributed MIB is not fully distributed, rather each module maintains some of the data locally and fetches the rest from the remote modules. The data within a distributed MIB can be broken down into the following types:

Local Data

Remote Data

The MIB tree contains data that is maintained locally and pointers to remote data (pointers to data on other modules).

5.2 Distributed Managed Objects

Figure 6:
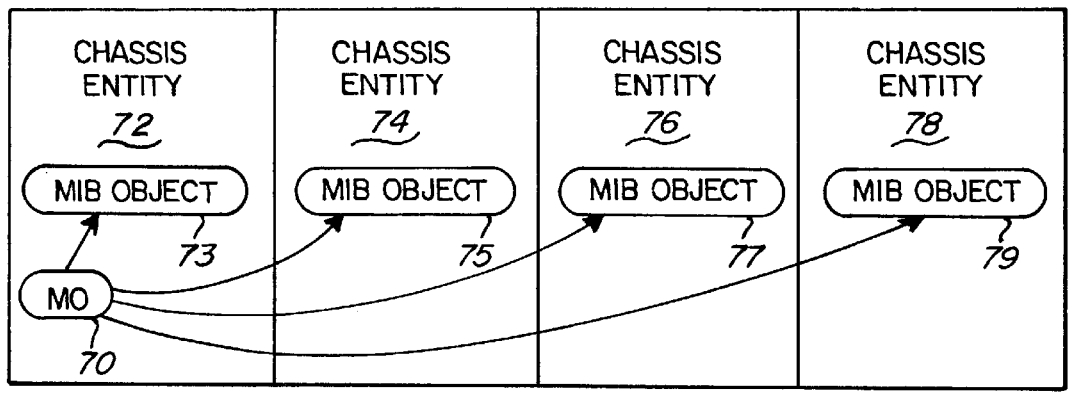
FIG. 6 is a schematic illustration showing the local and remote registration of a distributed managed object on the chassis modules (entities)

To implement a distributed MIB, a remote registration process is needed. In this remote registration process, as illustrated in FIG. 6, every registering module or entity 72, 74, 76, 78 in the chassis registers under a particular branch (OID) on every other entity, as well as locally.

The same managed object MO (70) appears in each MIB object 73, 75, 77, 79, respectively, under the same branch. Remote or local access to the managed object is transparent to SNMP operation. A SET, GET or GETNEXT operation acts as if the remotely registered object were local.

Figure 7:
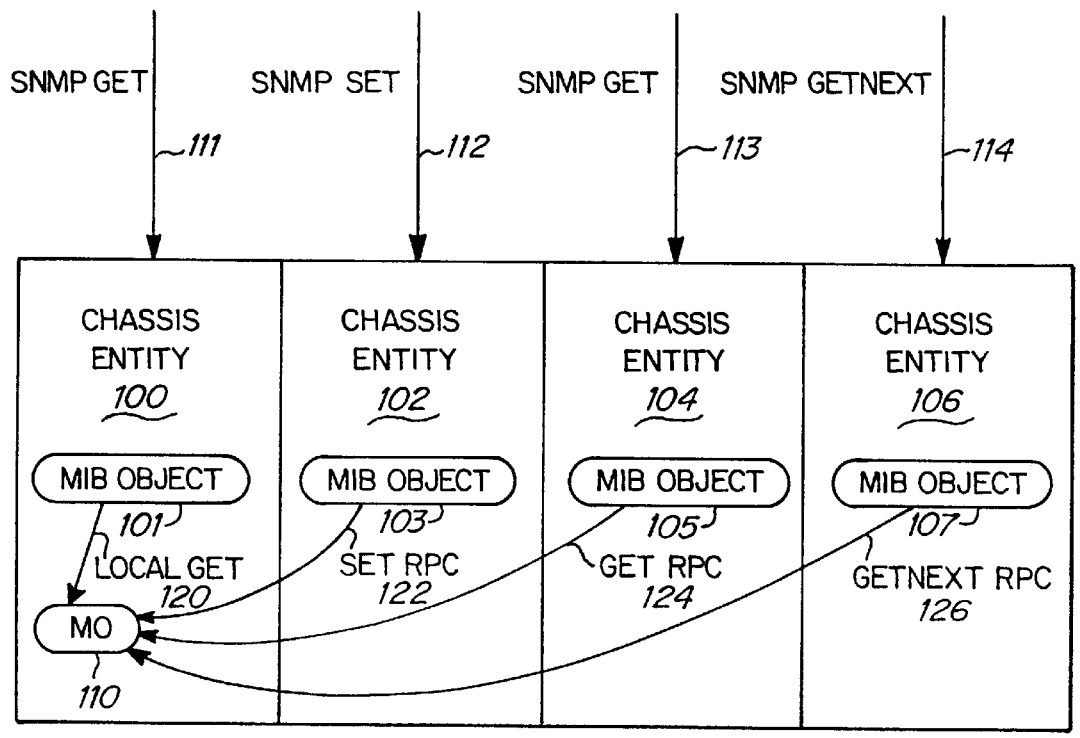
FIG. 7 is a schematic illustration showing generally the retrieval of a managed object (MO) in response to instructions received on both local and remote modules.
Figure 8:
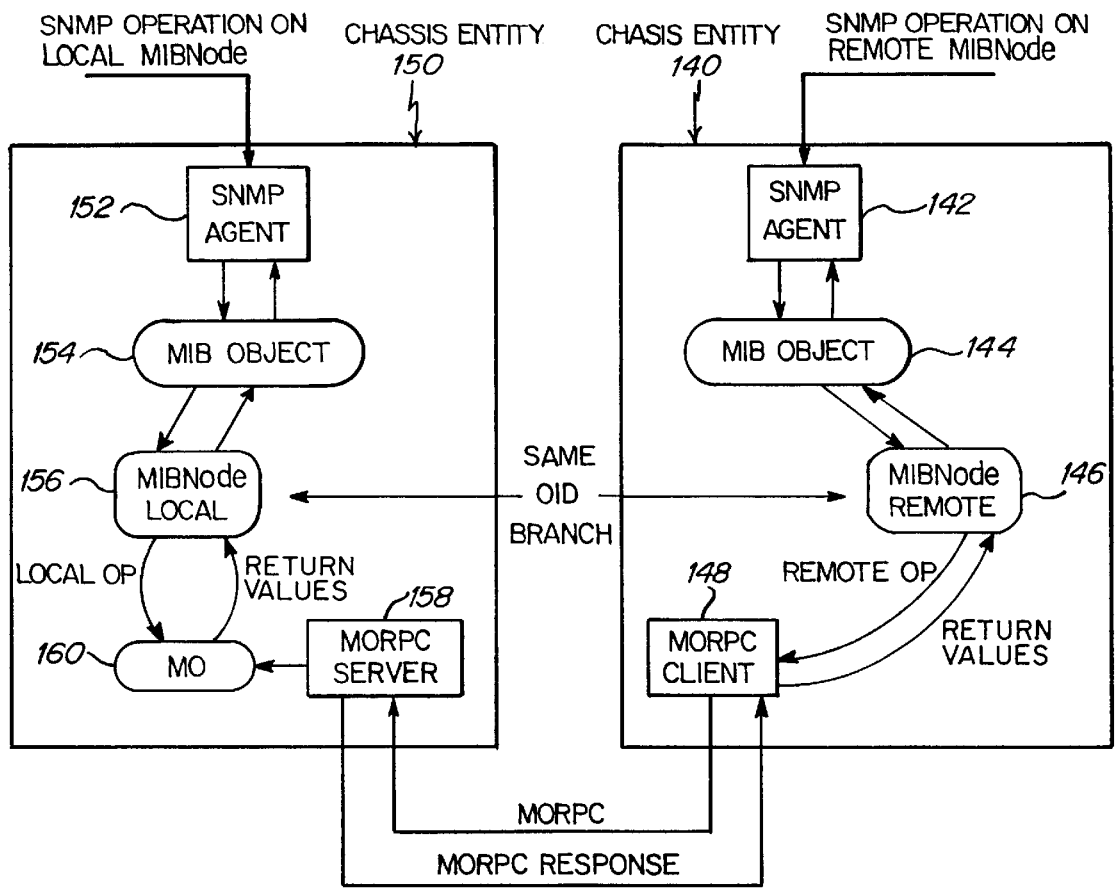
FIG. 8 is a schematic illustration similar to FIG. 7 showing more specifically a method of retrieving a managed object held on a local or remote module.

To resolve a SNMP operation on the MIB object, the SNMP agent searches the MIB (via the MIB object) and finds the MO registered for the OID in the operation. Once the MO is found, the MO's member function corresponding to the particular operation (GET, GETNEXT, SET) is called. Before distributed MO's, this was a "local" procedure call, meaning that all the software code that ran as a result of this call was local to this processor (in local memory). Now with distributed MO's, this is not the case. If a SNMP operation resolves to an operation on a remote MO, a MORPC (Managed Object Remote Procedure Call) will be performed. FIGS. 7–8 depict this situation, where it is assumed that the MO has been registered successfully with all chassis entities.

The above-described type of registration is not limited to leaf objects. Table objects may also be registered in this manner.

5.3 Distributed Managed Object RPCs

As discussed in the previous section, managed objects can be distributed across multiple entities through the use of MORPCs. There are six MORPCs that can be generated by an SNMP agent: REGISTER, UNREGISTER, GET, GETNEXT, SETVALIDATE and SET. A response packet for MORPC is generated by the MORPC "server" on the remote side of a call. This is completely analogous to a return value for a local MO call and is illustrated in FIG. 8.

MORPC can be implemented over any transport layer protocol. The only change would be in the address field of the MIBNode object (indicating the remote address of the managed object). The present implementation uses UDP, which is part of the TCP/IP protocol suite.

MORPC REGISTER operations occur with all chassis entities when a MO registers as a distributed MO. Registration is a guaranteed operation. An MO cannot be partially registered (i.e., registered with a subset of chassis entities). If a chassis entity becomes active after a MO has registered, the MO (or set of MOs) is registered with it during the entity's start-up (module discovery).

MORPC UNREGISTER operations occur with all chassis entities when a distributed MO unregisters. The unregister operation is also guaranteed. An MO cannot be partially unregistered.

MORPC GET, GETNEXT, SET, and SETVALIDATE are not guaranteed operations. If they fail after a specified time-out period, the entire SNMP packet is dropped.

FIG. 7 shows generally four chassis modules or entities 101, 102, 104, 106. MIB object 101 is registered locally on module 100, and remotely as MIB object 103, 105, 107 on modules 102, 104, 106, respectively. Managed object (MO) 110 is maintained locally on module 100. A GET operation 111 on module 100 finds the MO 110 locally, and issues a local call procedure (local get 120) to resolve the operation. In contrast, a SET operation 112 received on module 102, finds the MO 110 located remotely and issues a remote procedure call (set RPC 122) to resolve the operation. Similarly, GET operation 113 received on module 104 is resolved via a remote procedure call (get RPC 124), and GETNEXT operation 114 on module 106 is resolved as a remote procedure call (getnext RPC 126).

FIG. 8 illustrates more specifically the method of local and remote retrieval and call processing. Illustrated on the right, an SNMP operation is received by SNMP agent 142 in chassis entity 140. The agent locates a remote MIBNode 146 in MIB tree 144 and initiates a remote operation via MORPC client 148. Then MORPC client 148 issues a call to MORPC server 158 on chassis entity 150 where the managed object 160 is maintained. The MORPC server 158 retrieves the managed object 160 and sends a MORPC response to MORPC client 148, which sends the return values from MO 160 back to SNMP agent 142. In the case (on the left) of a local SNMP operation, SNMP agent 152 discovers the local MIBNode 156 in the MIB tree 154, and retrieves the MO 160 locally on chassis entity 150. The return values are sent to SNMP agent 152 without requiring utilization of the MORPC server.

The present invention is not limited to the allocation of management functions across the chassis, but may be utilized to allocate any type of application across one or more modules in the chassis.

The present invention is particularly useful in combination with the subject matter disclosed in two copending and commonly-owned applications entitled:

"Network Having Secure Fast Packet Switching And Guaranteed Quality Of Service", by Kurt Dobbins et al.; and "Fault Tolerant System Management Bus Architecture", by Brendan Fee et al.

both filed on the same date and which are each hereby incorporated by reference in their entirety.

While there have been shown and described several embodiments of the present invention, it will be obvious to those skilled in the art that various changes and modifications may be made therein without departing from the scope of the invention as defined by the appending claims.

What is claimed is:

1. A distributed system comprising:
    a first device for communicating through a communications network, the first device having a first network address and being capable of executing a distributed process; and
    a second device for communicating tough a communications network, the second device having a second network address and being capable of executing the distributed process, wherein both the first and second devices are capable of transmitting and receiving information related to the distributed process using a third network address, wherein the third network address includes an IP address and a MAC address.

2. A distributed system comprising:
    a first device for communicating through a communications network, the first device having a first network address and being capable of executing a distributed process; and
    a second device for communicating through a communications network, the second device having a second network address and being capable of executing the distributed process, wherein both the first and second devices are capable of transmitting and receiving information related to the distributed process using a third network address, wherein the first and second devices are configured to elect which one of the first and second devices executes the distributed process.

3. A distributed system comprising:

a first device for communicating through a communications network, the first device having a first network address and being capable of executing a distributed process; and a second device for communicating through a communications network, the second device having a second network address and being capable of executing the distributed process, wherein both the first and second devices are capable of transmitting and receiving information related to the distributed process using a third network address, wherein the first device includes a MIB tree of object identifiers for accessing corresponding objects and wherein the MIB tree contains data for objects which are stored locally on the first device and a pointer for a data object stored on the second device.

4. A method comprising steps of:

providing a plurality of network modules executing a distributed application; and providing a single agent address for accessing the distributed application wherein each of the plurality of network modules are capable of transmitting and receiving information using the single agent address as a source address, wherein the modules are disposed in slots of a chassis and the application is a network management application which enables the chassis to be managed as a whole.

5. The method of claim 4, wherein:

each network module executing the distributed application listens for packets having the agent address.

6. A method comprising steps of:

providing a plurality of network modules executing a distributed application; and providing a single agent address for accessing the distributed application wherein each of the plurality of network modules are capable of transmitting and receiving information using the single agent address as a source address, wherein each module exchanges information which includes one or more of:

resources of the respective module, applications of the respective module, and availability of resources; and each module elects, based on the information, which of the modules will execute the distributed application.

7. A method comprising steps of:

providing a plurality of network modules executing a distributed application; and providing a single agent address for accessing the distributed application wherein each of the plurality of network modules are capable of transmitting and receiving information using the single agent address as a source address, wherein the agent address is a combination of a chassis IP network address and a chassis MAC address.

* * * * *